Sept. 2, 1924. 1,506,840
R. B. KERNOHAN ET AL
STRUCTURE AND METHOD OF OPERATION OF HEATING FURNACES
Filed Dec. 8, 1921 6 Sheets-Sheet 3
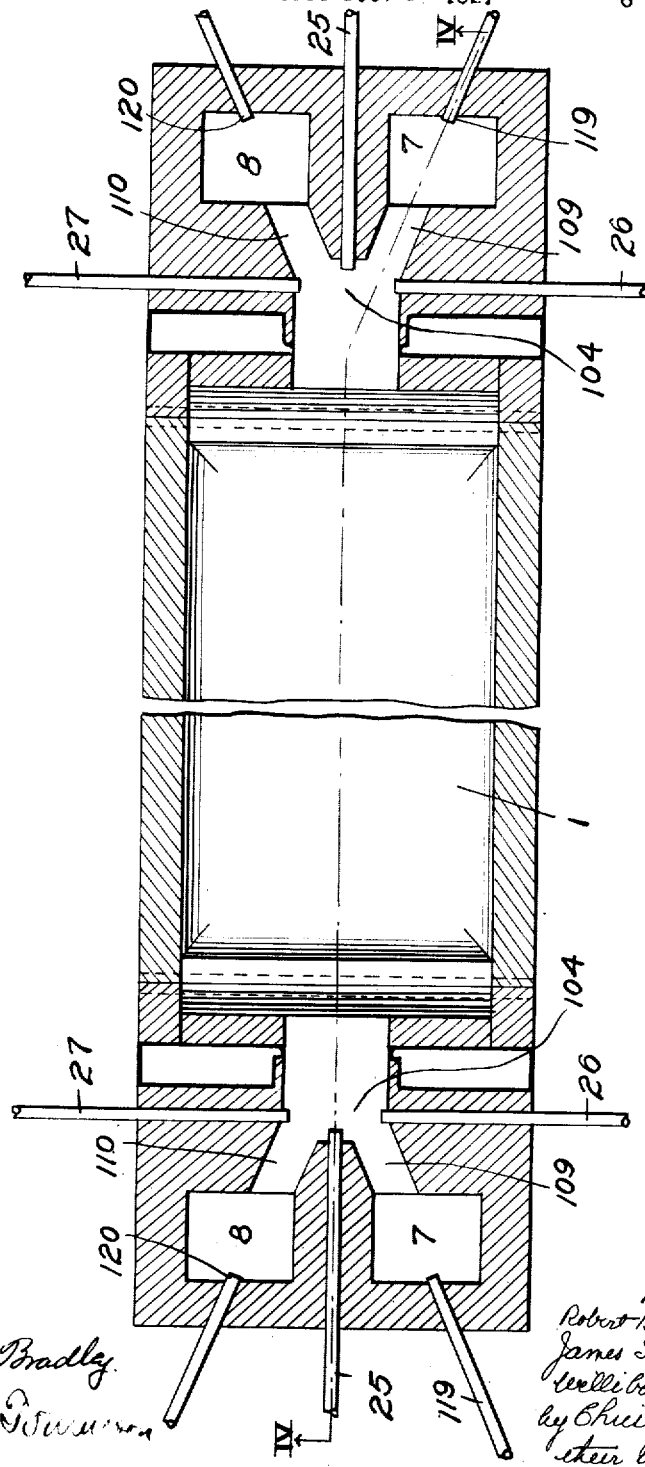
FIG. III.
WITNESSES
INVENTORS
Robert B. Kernohan
James S. Lochhead
Archibald Trinks
by Christy and Christy
their attorneys

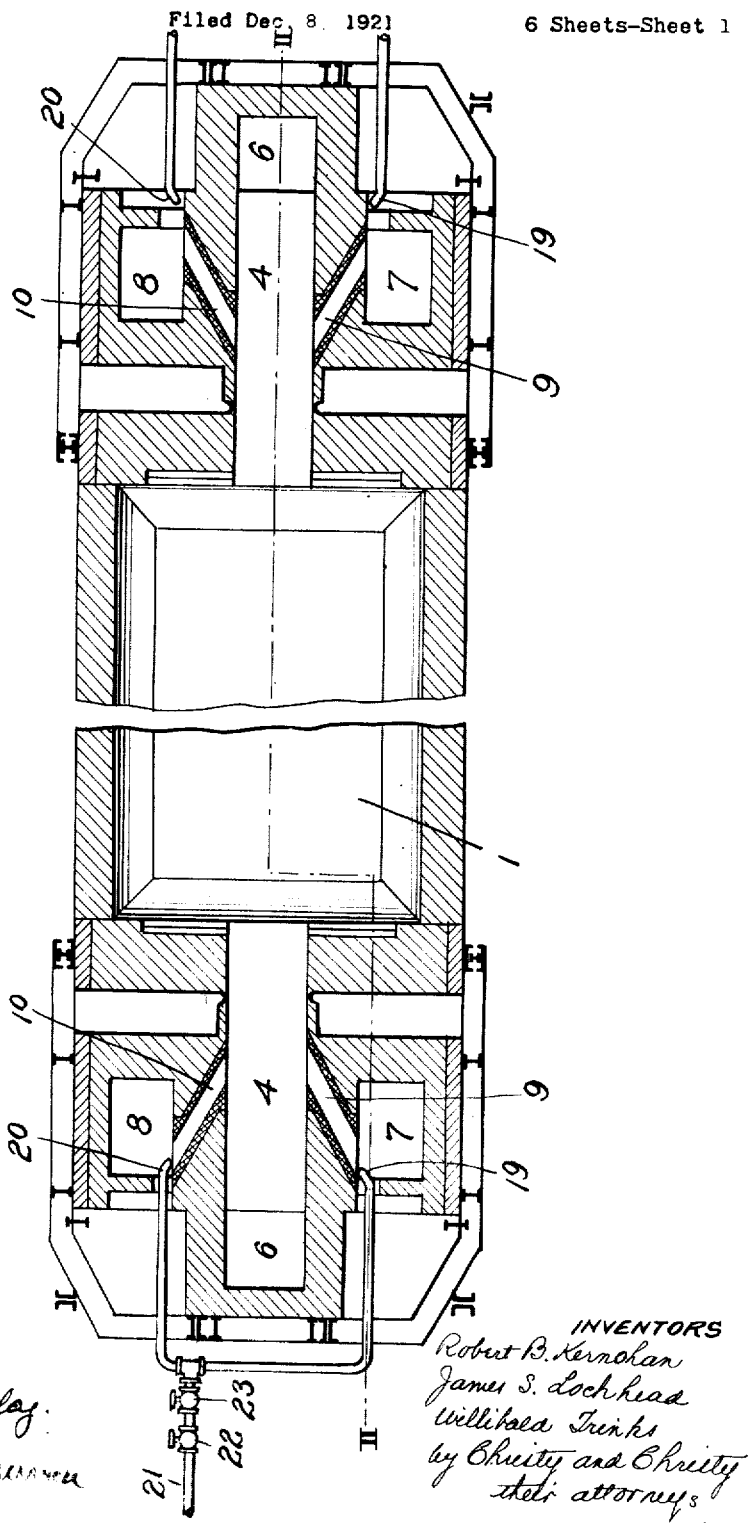

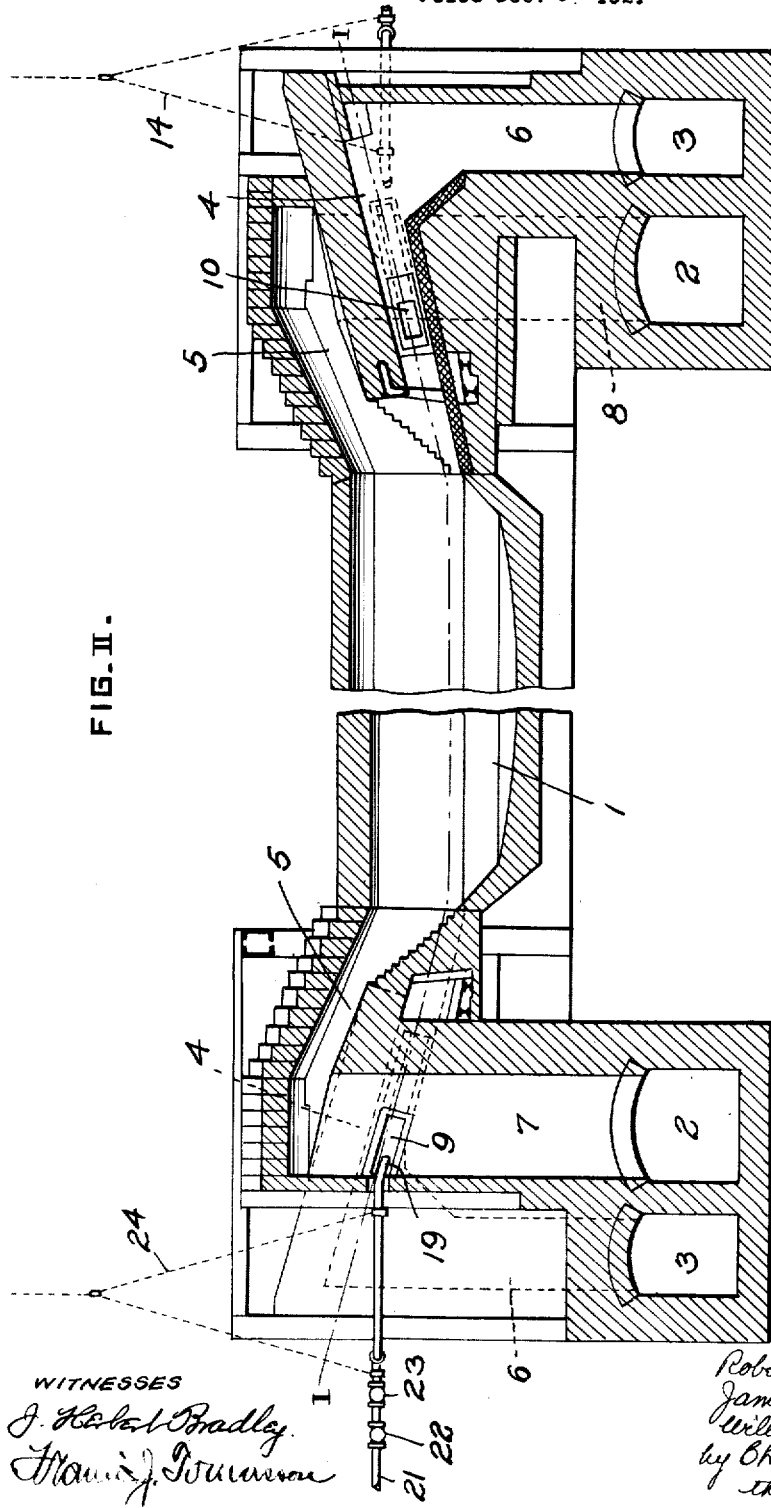

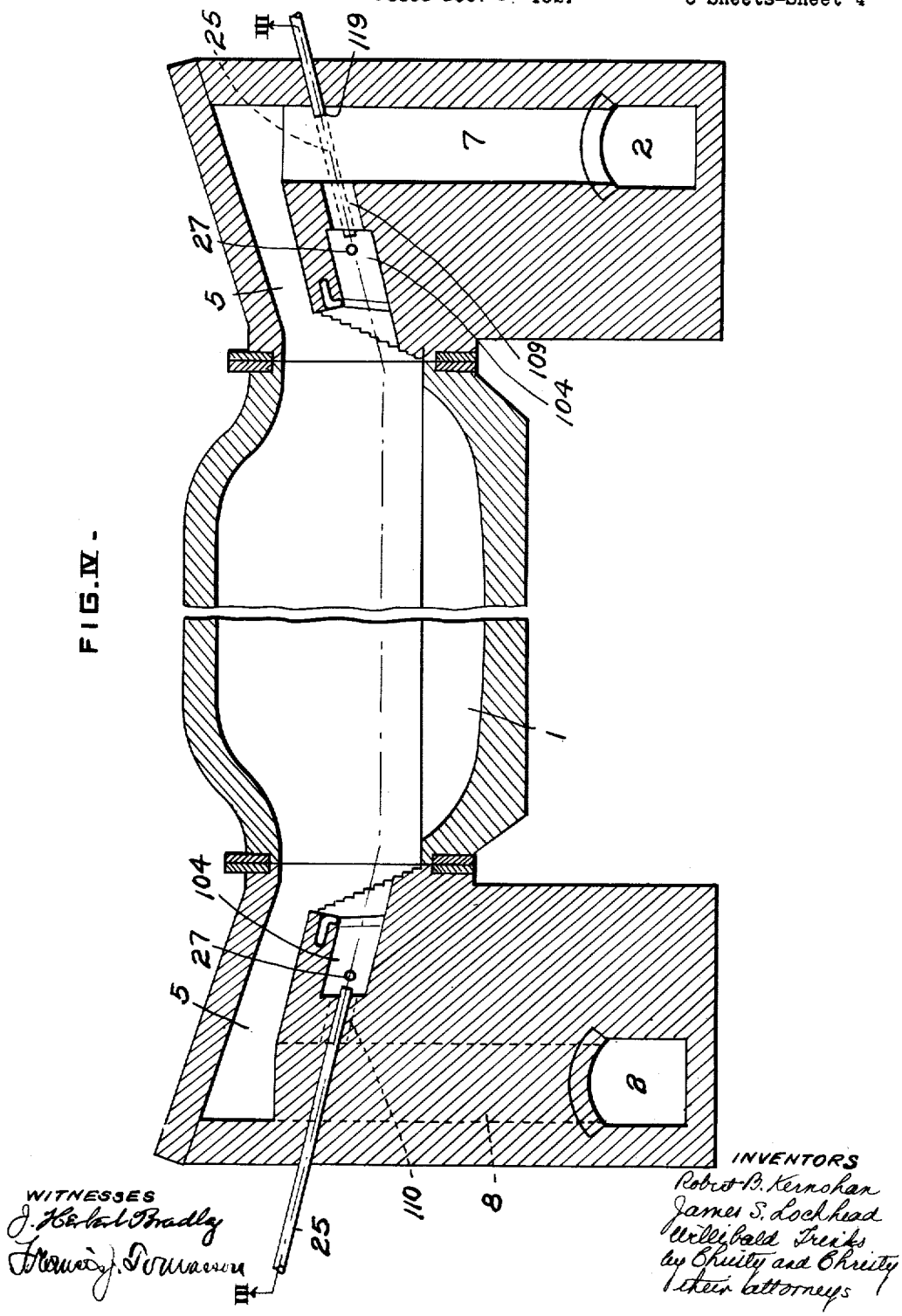

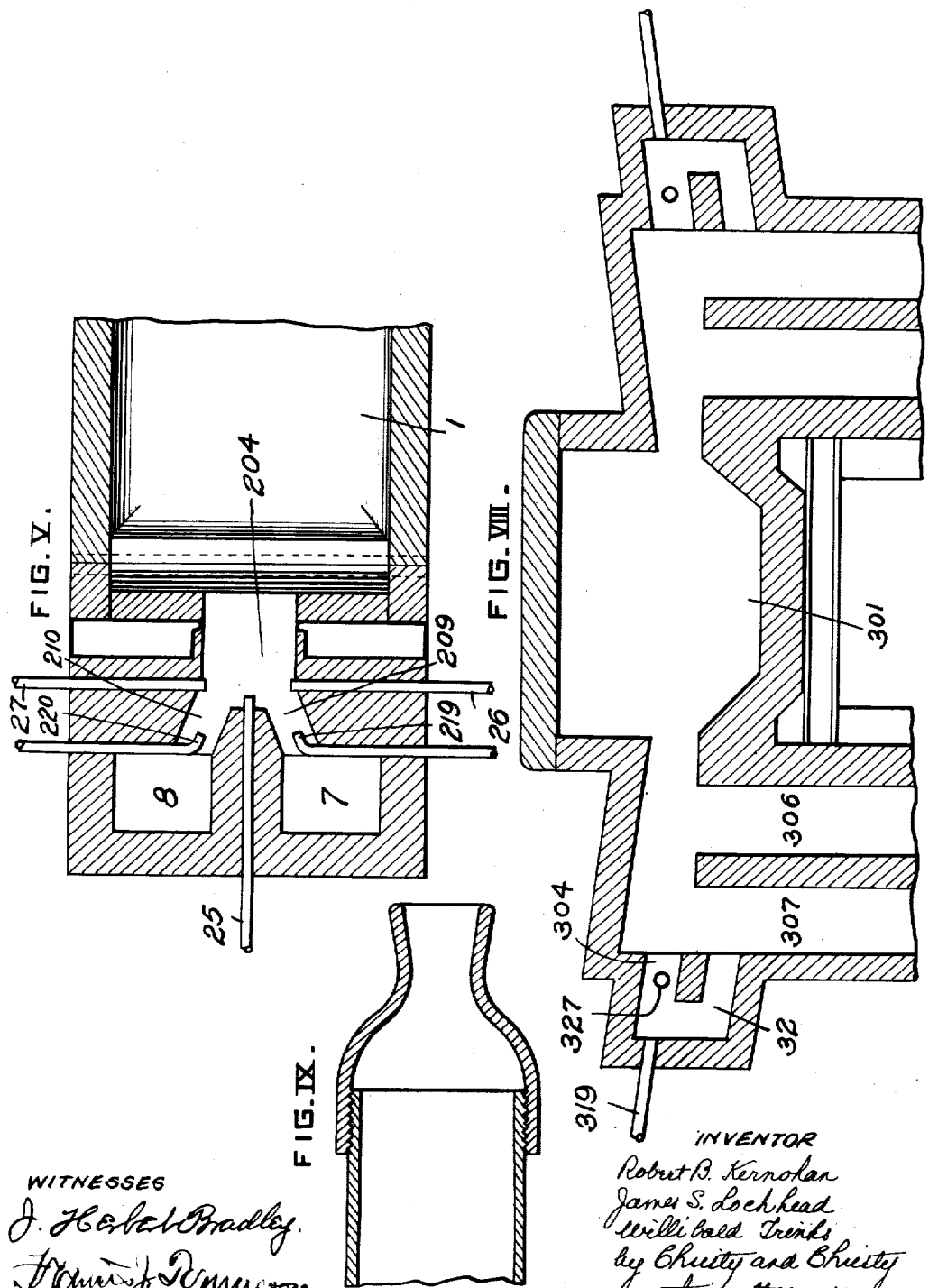

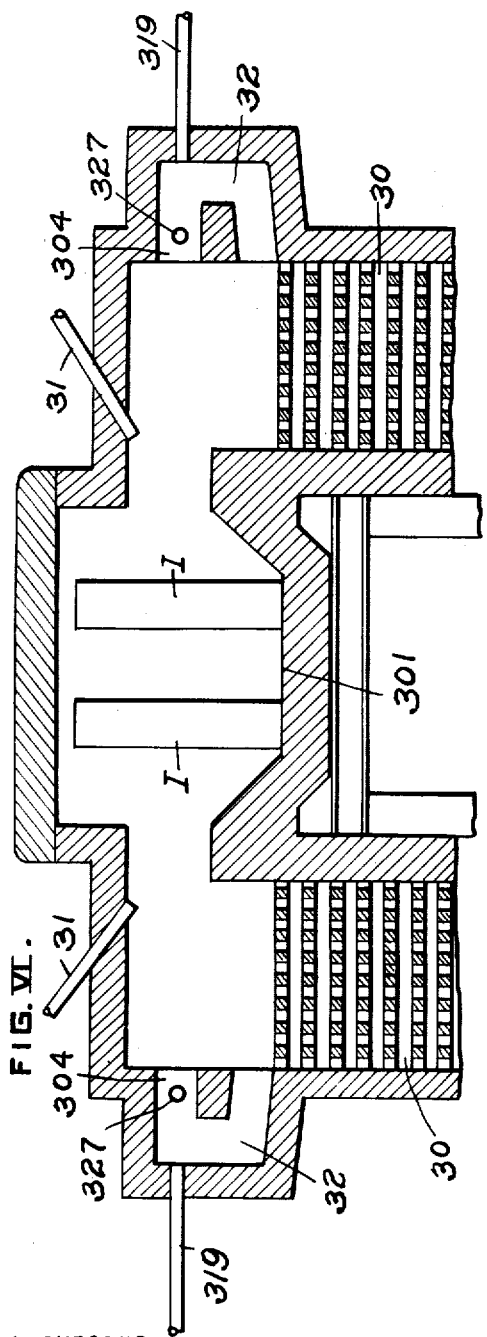
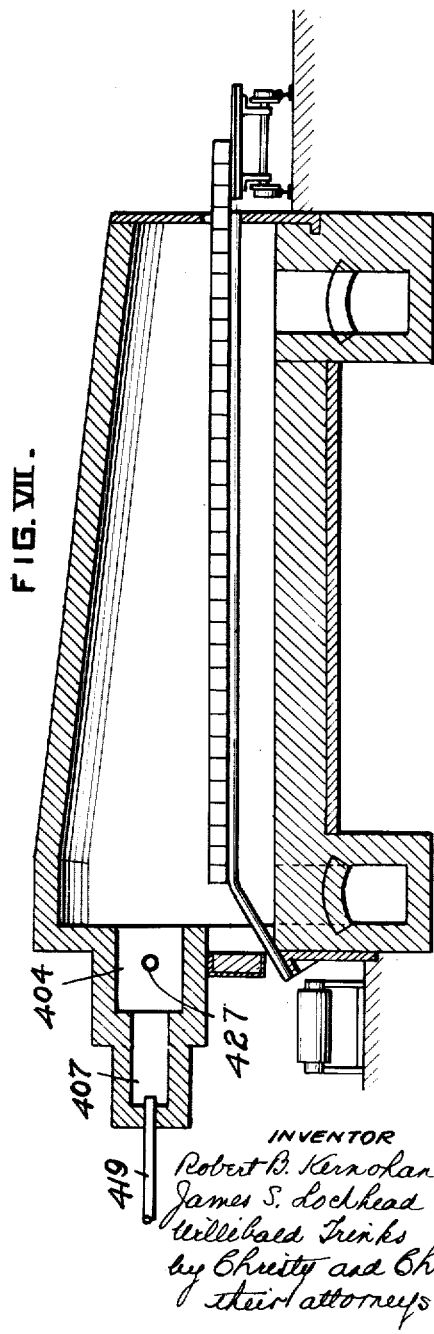

Patented Sept. 2, 1924.

1,506,840

UNITED STATES PATENT OFFICE.

ROBERT B. KERNOHAN, JAMES S. LOCHHEAD, AND WILLIBALD TRINKS, OF PITTSBURGH, PENNSYLVANIA.

STRUCTURE AND METHOD OF OPERATION OF HEATING FURNACES.

Application filed December 8, 1921. Serial No. 520,926.

*To all whom it may concern:*

Be it known that we, ROBERT B. KERNOHAN, JAMES S. LOCHHEAD, and WILLIBALD TRINKS, residing at Pittsburgh, in the county of Allegheny and State of Pennsylvania, all citizens of the United States, have invented or discovered certain new and useful Improvements in Structure and Method of Operation of Heating Furnaces, of which improvements the following is a specification.

Our invention relates to improvements in the structure of and in the method of operation of heating furnaces. It includes improvements upon the disclosures of an application of two of the present applicants, Kernohan and Lochhead, for United States Letters Patent, filed October 29th, 1920, Serial No. 420,377. This application is in part a continuation of our application filed October 1, 1921, Serial No. 504,640.

Our invention, as in the sequel will appear, is applicable generally to heating furnaces and their operation, but we shall first describe it in the particular application in which we have developed it, the application, namely, to an open-hearth steel furnace.

In the accompanying drawings, Figure I is a view in approximately horizontal section, on the plane indicated by the broken line I—I, Figure II, of an open-hearth steel furnace, in which, and in the operation of which, our invention is present and may be carried out. Figure II is a view in vertical section of the same furnace, on the plane indicated by the broken line II—II, Figure I. Figures III and IV are views corresponding to Figures I and II and illustrating certain modifications of the invention. Figure V is a fragmentary view, corresponding to Figures I and III and illustrating further modification. Figures VI, VII, and VIII are views in vertical section, VI and VIII through ingot heating furnaces, VII through a billet heating furnace, and in these figures the applicability of our invention to these furnaces, various in kind, is illustrated. Fig. IX is a view in longitudinal section and to much larger scale of a certain nozzle, which we preferably employ, as hereinafter explained.

Referring first to Figures I and II, the furnace includes the usual hearth 1, upon which the charge is borne and where the essential refining operation takes place. Producer gas, preheated in the regenerator (not shown) flows through passageway 3; thence it rises through vertical passageway 6, and enters from the rear the medially arranged downwardly inclined tunnel port 4. Through this port the stream of gas is carried into the furnace chamber. Atmospheric air, preheated in the air regenerator (not shown), flows through passageway 2; thence it rises in divided flow through two vertical passageways 7 and 8, symmetrically arranged one on either side of the mid-line of the furnace, and enters from the rear the downwardly inclined port 5, over-arching port 4. Through this port air is carried into the furnace chamber. Ducts 9 and 10 lead from air passageways 7 and 8 and open into port 4. Of these ducts it is to be observed that they are symmetrically arranged and that the flow through them will be symmetrical with respect to the mid-line of the furnace; they extend obliquely forward, and the streams flowing through them will converge with the stream flowing directly through the tunnel port 4; they open into the tunnel port 4 at an intermediate point in the length thereof, and the converging streams will mingle before the mouth of the port is reached. Nozzles 19 and 20 are provided, through which compressed air from a supply pipe 21 may be blown in jets forwardly through ducts 9 and 10. In supply pipe 21 is a valve 23 for regulating the flow, and conveniently a second valve 22, for cutting off the flow entirely.

The showing afforded in Figs. I and II will be understood to be diagrammatic, and particularly in these respects:—The ducts 9 and 10 are shown as rectangular in cross section and uniform in dimensions throughout their extent. Manifestly they may be particularly shaped according to the teaching of pneumatics, to afford in highest degree the effect described; the nozzles 19 and 20, shown diagrammatically as mere tapered terminations of the feed pipes protruding into the ducts, may be elaborated and refined in form; they may be made of the multiple-jet type; they may in position be so related to the form of the ducts as best to achieve their effect; again, the openings through the walls of passageways 7 and 8, through which the nozzles 19 and 20 are shown to be movable are, in order that the structure may be clearly understood, shown diagrammatically as greater in dimensions than in actual building they would be.

We pause to remark that the symmetry of the arrangement here described is a preferred, but not a limiting feature.

We have just said of the nozzles 19 and 20 that they may be elaborated and refined in form. And here we pause and anticipate a description of mode of operation to remark that jets of compressed air are projected longitudinally in ducts 9 and 10 at the intake end of the furnace to induce flow of streams of air from uptake passageways 7 and 8 through these ducts 9 and 10 and into port 4. Our further and more specific invention in respect to these ducts is illustrated in Fig. IX, where we show a nozzle of a convergent-divergent shape, sometimes called a DeLaval nozzle. Inspection of Fig. IX will in view of the foregoing statement make plain the feature here dwelt upon.

The convergent-divergent nozzle has this capacity,—that if gas under pressure exceeding a critical minimum (for air this critical minimum is a pressure of approximately two atmospheres) be jetted through it, a very high jet velocity may be attained. From an ordinary convergent nozzle jet velocity is limited to the velocity of sound in air,—about 1,100 feet a second. From a convergent-divergent nozzle jet velocities of 1,500 feet a second and even higher may be got.

The advantage of this high-velocity nozzle to our invention is this: If the compressed air jetted through nozzles 19 and 20 be unheated it will on mixing with the air drawn from passageways 7 and 8 effect some cooling of the streams, and there is a point beyond which such cooling may not advantageously be carried. On the other hand, it is an economic advantage if the air jetted from the nozzles may be used in unheated condition. Increased velocity of jet means that the same flow of heated air from passageways 7 and 8 through ducts 9 and 10 may be got with jets of diminished volume. Accordingly, the employement of convergent-divergent nozzles means that we can use unheated air under conditions which otherwise would require preheating,—preheating, that is, of the compressed air jetted from the nozzles.

In certain of the ensuing claims we use the phrase "high-velocity jet" of gas. By that phrase we designate a jet of the character here defined,—a jet, that is to say, exceeding in velocity any jet which may be forced from an ordinary convergent nozzle, and such as may be delivered from a convergent-divergent nozzle, as described.

We have shown the compressed air supply pipes 21 at opposite ends of the furnace, together with the connections which terminate in nozzles 19 and 20, to be suspended, as by chains 24, and it will be understood that by such means the nozzles 19 and 20, positioned as shown at the intake (left hand) end of the furnace, may at the outtake (right hand) end be swung aside, away from the deleterious influences of the outflowing products of combustion. As an alternative expedient, these pipes may be stationary and the nozzles water-jacketed— an expedient so well known in the general field of furnace structure as to require no illustration.

As shown in the drawings, the furnace-reversing instrumentalities will be understood to be arranged for the inflow of gas and air at the left-hand end and for the outflow of products of combustion at the right-hand end. At the left-hand end of the furnace the valve 22 in the supply pipe 21 will be understood to be open, and at the right-hand end the corresponding valve will be understood to be closed, and at that end the pipe itself is shown to be retracted and the nozzles 19 and 20 withdrawn beyond the walls of vertical passageways 7 and 8. Gas and air are entering through the ports at the left-hand end and are burning in a flame which sweeps from left to right, and the products of combustion are escaping through the ports and passageways at the right-hand end. At proper intervals of time the furnace is reversed and, incidentally to reversal, the pipe 21 and nozzles 19 and 20 at the right-hand end which had been retracted are advanced, those at the left-hand end which had been advanced are retracted. Valve 22 of the advanced pipe 21 is opened, while the corresponding valve in the retracted pipe has on retraction been closed. (Apparatus for effecting reversal of the furnace requires no illustration, and we have not sought to afford illustration of it.) The degree of opening of valve 23 may, if desired, be diminished as operation upon a given furnace charge progresses, to the end that at the beginning the flame may be relatively short and sharp and toward the end relatively long and lazy.

In the operation of open-hearth furnaces as commonly conducted hitherto, the draft through the furnace has been relatively feeble, and combustion has been imperfectly controlled. This has been particularly true of furnaces fired with producer gas. In the operation of these furnaces the air ordinarily has been drawn through the air regenerators and into the furnace merely by the stack effect of the regenerators and the uptakes. The gas flowing from the producer and through the gas regenerator and thence to the furnace has been commonly subjected only to such pressure as is incident to its delivery from the producer. In some cases a blowing fan has been placed in the stream of the air supply to the furnace, but there is a practical limitation upon the building up of the pressure there. When the pressure exceeds a small amount, leakage through the masonry of the furnace structure becomes too great. It is difficult, because of expansions and contractions incident to service, to build a furnace which shall be tight against such leakage, and there is another difficulty to be dealt with. High pressures and high velocities, very desirable in order to produce a sharp flame, require that the ports be relatively narrow, and narrow ports do not afford at the discharge end of the furnace unhindered exit for the products of combustion. (It is of course to be understood,—and the condition has already been alluded to,—that in ordinary open-hearth operation the flow of the flame is periodically reversed, and duplicate sets of ports at opposite ends of the furnace serve alternately to lead in the gas and air and to lead out the vastly greater volumes of hot products of combustion.) Because of these difficulties chiefly, and in spite of various relief projects, open-hearth operation as a matter of practice has been limited to low rates of flow of air and of gas and to the generation of a consequent long and lazy flame. This flame is still burning when it reaches the ports at the outgoing end of the furnace and combustion continues through the ports and even down into the regenerators—a state of things both wasteful and destructive. A proposal to use dampers for reducing the effective size of the passageways at the intake end of the furnace, with the end in view of increasing there the velocity of flow, involves complication of structure, and the dampers, when present, absorb a great deal of heat.

In the furnace of Figs. I and II, while operation is in progress, compressed air is blown through nozzles 19 and 20 into ducts 9 and 10. This compressed air may, as has been explained, be preheated or not, as found desirable or convenient, and if preheated, the preheating may be carried to any desired degree. But, as we have explained, the necessity for preheating may within wide limits be avoided. The jets of air issuing from the nozzles have high velocity—from 600 to 1500 feet per second or more,—a matter conditioned upon the actual pressure of the supply and upon the shape of the nozzle and the size and shape of the orifice. This high-velocity jet entrains hot air from the uptake passages 7 and 8, and induces a flow of air through ducts 9 and 10 into the stream of gas advancing through port 4. Thus the entering stream of air is divided; one portion is directed into port 4, where it mingles with the gas before entering the furnace chamber; the other portion flows unmingled through port 5 into the furnace chamber. The relative value of these two portions of the stream of entering air is variable and responsive to the degree of opening of regulating valve 23; if that valve be closed completely, all of the air will, under such conditions as usually obtain, enter the furnace chamber through port 5—and, indeed, because of the fact that usually the gas advances to the furnace under pressure greater than that of the air, there will be some back flow of gas from port 4 through ducts 9 and 10 and into the streams of air advancing to port 5. As valve 23 is gradually opened, such back flow of gas first is stopped, and then streams of air are directed forwardly through ducts 9 and 10 into the stream of gas in port 4. These streams of air increase in volume, and the streams flowing to port 5 correspondingly decrease, as valve 23 is opened wider. Ordinarily from one twentieth to one sixth by weight of the air flowing in ducts 9 and 10 is that which flows from the nozzles; the rest is drawn in from the streams of air rising through uptake passages 7 and 8. By properly proportioning in size ports 4 and 5, passageways 7 and 8, and ducts 9 and 10, it is possible by the means described to divert through ducts 9 and 10 into port 4 any desired fraction of the streams of air rising through uptake passageways 7 and 8. Indeed, it is possible so to divert substantially the whole of these streams; ordinarily it is not desirable in operation to go so far as that, but it is preferable to allow some air to enter the furnace through port 5.

When valve 23 is nearly closed the flame is long and lazy—such a flame in fact as is usual in open-hearth operation as commonly conducted hitherto; if the valve 23 is opened wide, the flame is short and sharp. Any desired sharpness of flame may be obtained by movement of the regulating valve 23. A shorter sharper flame than that usual in the open-hearth operation is desirable; combustion is then completed within the furnace chamber, where alone combustion is desired, and the passageways and regenerators through which the outflowing gases pass are not subjected to the destructive action of combustion in progress within them. Furthermore, regulation by valve 23 makes possible variation in quality of flame (if such variation be desired) according to the progress of the refining operation; at the beginning of a run the flame may be relatively short and sharp, and toward the end relatively long and lazy.

As has been intimated, we do not intend ordinarily to resort to special means for building up pressure on air or gas on the intake end of the furnace nor to special means for drawing the products of combustion out from the outgoing end. Nevertheless, the practice of our invention does not forbid the use of such ancillary apparatus, if for any reason it be found desirable.

The streams of air entering port 4 through ducts 9 and 10 produce combustion in port 4, to the extent that the air and gas mix. Mixture, however, is not complete until the gases have just left port 4 on their way to the furnace. In consequence, combustion in and just beyond the opening from port 4 is so rapid that an extremely high temperature is attained, in spite of the injection of cold or slightly preheated air through nozzles 19 and 20.

The projection of streams of air at relatively high velocity through ducts 9 and 10 and forwardly into port 4 effects an increased flow of gas, and that without an otherwise requisite increase of pressure in the gas uptake passageway 6. The jet of air under high pressure projected from the nozzle into the duct has great kinetic energy, and entrains or induces the flow of large weights of air (five to twenty times greater than issue from the jets) from the air passageways 7 and 8 through ducts 9 and 10 into port 4. Furthermore, by the use of the jets of compressed air, this projecting of streams of air through ports 9 and 10 is attained without subjecting the furnace structure to augmented pressure in the regenerators or in the air uptake passageways 7 and 8, and without resort to dampers.

We have consistently spoken of the substance projected through nozzles 19 and 20 as compressed air, and ordinarily compressed air will be best; air is requisite to combustion in ordinary practice, and is one component of the combustible mixture within the furnace chamber. But manifestly the jet might be constituted of some other fluid—of steam, for example, or of oxygen, or of a substance which, while not entering into the act of combustion, still serves mechanically, to divert the substance of one of the two streams through the ducts 9 and 10 into the other stream.

The arrangement of ports and passageways might be reversed, and gas rising through passageways 7 and 8 diverted and projected into the air advancing from passageway 6 through port 4.

The furnace illustrated in Figures I and II is designed for the use of gas as fuel and, specifically, producer gas. Figures III and IV illustrate a furnace in which various fuels and fuel mixtures may be employed. The general structure will be understood from what has gone before, and we shall describe those features only in which differences are found from the structure of Figs. I and II.

The fuel port 104 is in this instance fed, not through an uptake from a regenerator, but through fuel supply pipes 25, 26, and 27. Liquid-fuel pipe 25 opens into port 104 on the mid-line of the furnace from the rear, while a pair of opposite and symmetrically arranged gaseous-fuel pipes 26, 27 open from opposite sides. Liquid fuel will ordinarily be introduced under pressure. Gaseous fuel may be introduced under pressure or may be sucked in. Fuel of the character indicated introduced through pipe 25 alone, or through pipes 26 and 27, or through all three pipes, enters the streams of air which, impelled by jets issuing from nozzles 119 and 120, converge in and sweep through port 104, and the fuel so introduced into the streams of air is carried by the streams and is mingled with the air, and so the desired combustible mixture is formed. The flame springs from port 104 and, as the burning stream advances, the flame is nourished by supplementary streams of air entering the furnace through port 5.

The particular nature of the liquid fuel entering through pipe 25 may be such as is convenient and adequate, but—particularly where at the same plant with the open-hearth furnace a by-product coke plant is found—tar is available as a by-product, and its use in our furnace becomes a matter of convenience and economy. In place of tar, fuel oil may be used, or some other liquid fuel. This liquid fuel will be fed in under head or pressure. When tar is used, it is preheated and introduced under high pressure. The gas introduced into port 104 through pipes 26 and 27 may be artificial gas—from the same by-product plant, for example, as the tar—, or it may be producer gas of the water-gas type, or some other artificial gas, or it may be natural gas. We do not contemplate, in the case of this furnace of Figures III and IV, a pre-heating of the gas by regenerator or otherwise, and, although we do not limit ourselves to the use of gas of any particular quality in matters of combustibility and heat units, still (if high temperatures are to be obtained) the gas should be a relatively rich gas. As we have said, we may, in the operation of our furnace, use tar alone as fuel, or gas alone, or we may use both, the one in substitution for the other, or by way of augmentation the one of the other, or we may regularly use both as substantial and permanent components of our fuel supply. Of course the rate of flow of liquid fuel to port 104 and the volume and the pressure of the gas supply may be controlled by ordinary means, a showing of which is deemed unnecessary.

One further specification regarding fuel may here be made. Powdered carbonaceous material, commonly powdered coal, carried on a stream of air or other gas is a known fuel, partaking largely of the character of fluid fuel,—notably in that it may be carried by a pipe and delivered in a stream. We mean in our ensuing claims to include such fuel under the term "fluid fuel."

The nozzles 119 and 120 are in this case (Figs. III and IV) so arranged that they project their jets across passageways 7 and 8 and into the ends of ducts 109 and 110.

In operation of the furnace of Figures III and IV, the notable difference from that of Figures I and II is in the fuel intended to be used. The fuel is fluid and may be gaseous or may include a gaseous carrier and if gaseous, while it may be, the expectation is that ordinarily it will not be, preheated. The fuel pipes at the outgoing end of the furnace will be understood to be closed. At the inlet end the fuel pipes 25, 26, 27, or so many of them are to be used (according to the description given above) are open. The streams of air impelled by jets from nozzles 119 and 120 and flowing through ducts 109 and 110 and thence through port 104 into the furnace chamber take up the fuel which enters port 104, form with the fuel a combustible mixture, and then advance flaming into the furnace chamber. The other portion of the air supplied flows unmingled through port 5 to the furnace chamber, and there nourishes the flame. We do not mean to limit ourselves to particular pressures, but ordinarily in the operation of the furnace of Figs. III and IV under the draft conditions usual in open-hearth operation, a supply through nozzles 119 and 120 of compressed air under a pressure of from 20 to 40 pounds will be found adequate.

The showing afforded by Figure V is in all respects the same as that of Figure III, with the following exception:—the nozzles 219 and 220, instead of being arranged on the farther side of passageways 7 and 8 and delivering their jets across those passageways (as shown in Figure III), are arranged to deliver their jets within ducts 209 and 210. The arrangement in this respect is similar to that of Figure I. A refinement of operation is consequent upon this arrangement. The primary function for which these jets are provided is that already described,—to impel flow of air through ducts 209, 210 into port 204. A secondary function is this: Compressed air (or equivalent fluid) may be projected from nozzles 219 and 220 at the outgoing end as well as at the intake end of the furnace and in consequence a pressure condition may be built up in the port 204 at the outgoing end, sufficient to partially or completely prevent ingress of the products of combustion to the port 204, and passage thence through ducts 209 and 210. Correspondingly, the products of combustion will pass out through port 5, and port 204 and the connected parts will be relieved of the erosion and deleterious effects of the sweep of outgoing gases.

Figure VI shows diagrammatically a heating furnace for ingots, the familiar pit furnace provided at a blooming mill. In it ingots I are shown resting on the hearth 301 of the furnace chamber. Furnaces for this purpose are ordinarily regenerative furnaces and admit of a considerable latitude in structure and considerable modification in mode of operation. The furnace shown will however serve as a typical furnace of this general sort. In this particular instance it will be observed that it is the air only which is regenerated in regenerators 30, while the fuel (which in this instance will be understood to be gas relatively rich in quality—coke-oven gas, for instance) is introduced through pipe 31 into the stream of regenerated air as it advances to the furnace port. A structure is built upon the wall of the passageway from regenerator to furnace port which in mill parlance is called a "doghouse." Within this doghouse, as clearly appears, is formed a by-pass 32, through which a fraction of the advancing stream of air is shunted. Into this by-pass open fuel-supply pipes 327 (the number and arrangement may be such as desired, ordinarily the arrangement will be symmetrical with respect to the line of flow). The fuel introduced may be liquid or gaseous, or fluid (within the definition given above), or different pipes may bring in different fuels, and the fuel may be introduced under pressure or by suction—all of these matters have already been explained in connection with the furnace of Figs. III and IV, and what is there said is applicable here. Pipe 319 carries compressed air (or equivalent fluid). It extends into the by-pass 32, and from it a jet is projected in the line of flow through the by-pass and in the direction of the furnace chamber and such jet serves, as in the other cases already described, to impel flow through the by-pass and through the port, into the furnace. The structure differs from the structures of Figures I to V, inclusive, in that the jet-impelled branch of the stream reunites with the other branch, and the united stream enters through the single port into the furnace. This is a variant which may be noted in passing. We have said that a gas of relative richness will in ordinary contemplation be introduced through the fuel-supply pipe 31 at the inlet end of the furnace. This gas may be natural gas, for example, or coke-oven gas, or even producer gas. From what has gone before the operation will be fully understood.

Figure VIII serves merely to indicate how the same essential invention may be applied to an ingot-heating furnace in which both air and gas are regenerated and rise through uptakes 307 and 306 to the furnace port. No labored explanation is needed. The structure and operation will be understood from what has already been said.

Figure VII shows a billet furnace of familiar construction. Upon the furnace wall is built a doghouse, into which doghouse there opens an uptake passageway 407 for air, which it will be understood may lead from a recuperator or from a regenerator. The chamber 404 within the doghouse, so supplied with air, opens to the furnace chamber. Into chamber 404 fuel is introduced, as is indicated at 427, and nothing more need be said about fuel than to remark that fuel of any preferred character may be introduced in the manner and by the means already described. A compressed-air pipe 419 discharges a jet in the line of flow of air through the chamber 404, and into the furnace chamber.

Mention of a recuperator gives occasion to note a further advantage of our invention. A recuperator is a heat exchanger in which streams of entering air (or gas) and of outflowing flaming gases or hot products of combustion flow in contiguous passageways, separated by a heat-penetrable partition wall. This wall ordinarily is a thin wall of brickwork. Draft through the furnace is ordinarily maintained by a stack; and in the recuperator, while the stream of air flowing on one side of the partition is under a pressure slightly in excess of that of the atmosphere, the stream of hot gas flowing on the other side of the partition is, in consequence of the draft condition established by the stack, under a pressure appreciably less than atmospheric. A thin wall of brickwork is liable to deterioration and leakage, and, with inequality of pressure on its opposite sides, leakage means disturbance of draft through the furnace chamber and loss of efficiency. It should be understood that, heretofore, it has been impossible to suck the preheated air out of the recuperator except by its own buoyancy which, in some cases, has been augmented by the action of a fan at the cold air inlet of the recuperator. In any such case there is a pressure greater than atmospheric either throughout the whole length of the air passageways in the recuperator, or at least in that portion nearest to the hot-air outlet. The application of our invention now fully described to a furnace whose air supply is preliminarily heated in a recuperator achieves a proper firing of the furnace without the attendant necessity of an unbalancing of pressures in the recuperator; the suction effect of the jet in the air passageway leading to the furnace is to reduce the pressure of the entering air in the recuperator to substantially that of the products of combustion flowing out through the recuperator to the stack. Consequently, wear and tear does not bring about that loss in efficiency just pointed out.

In describing the structure of these Figures VI, VII and VIII we have said, generally, that the jet is ordinarily of compressed air, and it ordinarily will be, but it is to be understood that we are not limited to the use of compressed air, in view of what we have already said, our invention is embodied in the provision of a jet of fluid. With this brief definition of parts, it is believed that the structure and operation of the furnace of Figure VII also will be clearly understood.

All that was said with reference to the furnace of Figs. I and II concerning variations in and refinements of structure; concerning the nature of the fluid projected from nozzles 19 and 20, and concerning its pressure and temperature, and the effects of variation in these matters; all that was said concerning draft conditions maintained and means of maintaining them, will be understood to be applicable to the furnaces of Figures III—VIII and their operation, What has been said concerning pressure and temperature of fuel will be understood to be applicable generally in the operation of the furnaces described.

Reviewing the structures of all of the figures, it will be seen that there is throughout a chamber which, varying in detail, possesses constant characteristics. We allude to the chamber 4 of Figures I and II, 104 of Figures III and IV, 204 of Figure V, 304 of Figures VI and VIII, and 404 of Figure VII. In the ensuing claims we use in some cases the term "port", in some cases the term "mixing chamber". It will be understood that the varying phrase merely lays emphasis upon certain characteristics of this same structural element, and neither term is used in any specifically limiting sense.

We have illustrated a considerable latitude in modification of structure, and in method of operation. In so doing we have not intended to limit the range of permissible latitude, but to indicate rather that the field is wide within which our invention may be practiced.

We claim as our invention:

1. In a heating furnace using preheated air for combustion the method of operation herein described which consists in maintaining a passageway for such preheated air leading to the furnace chamber and in projecting into such passageway a flow-inducing jet of compressed gas at a velocity exceeding that of sound and causing fuel to mingle in the stream.

2. In the operation of a furnace using preheated air for combustion the method herein described of impelling the flow of air to the furnace chamber which consists in projecting into the line of flow a jet of gas at a velocity exceeding that of sound.

3. The method herein described of developing a flame in a heating furnace which consists in impelling under jets of fluid a plurality of streams of air into confluent entrance into the furnace chamber, and projecting into the confluent streams a supply of liquid fuel.

4. In a heating-furnace structure the combination with a furnace chamber of an air passageway leading thereto, means for projecting into said air passageway a flow-inducing jet of gas at a velocity exceeding that of sound, and means for admitting fuel to the induced stream, substantially as described.

5. In a heating-furnace structure the combination with a furnace chamber provided with an intake passageway for air and an outgoing passageway for products of combustion, means for drawing the products of combustion through the outgoing passageway and means for projecting a flow-inducing jet of fluid at a velocity exceeding that of sound within the intake passageway, substantially as described.

6. The method herein described of firing a furnace which consists in establishing conditions of low-velocity flow through the furnace as a whole and at the intake end increasing locally the flow to a flow of high velocity by projecting into the flow a jet of fluid at a velocity exceeding that of sound.

In testimony whereof we have hereunto set our hands.
ROBERT B. KERNOHAN.
JAMES S. LOCHHEAD.
WILLIBALD TRINKS.

Witnesses:
S. A. McFarland,
I. G. Highly.

DISCLAIMER.

1,506,840.—*Robert B. Kernohan, James S. Lochhead,* and *Willibald Trinks,* Pittsburgh, Pa. STRUCTURE AND METHOD OF OPERATION OF HEATING FURNACES. Patent dated September 2, 1924. Disclaimer filed September 17, 1924, by the patentees.

Hereby enter their disclaimer—

"To claims 1, 2, 4, 5, and 6 of the said Letters Patent, No. 1,506,840, the said claims reading as follows:

"1. In a heating furnace using preheated air for combustion the method of operation herein described which consists in maintaining a passageway for such preheated air leading to the furnace chamber and in projecting into such passageway a flow-inducing jet of compressed gas at a velocity exceeding that of sound and causing fuel to mingle in the stream.

"2. In the operation of a furnace using preheated air for combustion the method herein described of impelling the flow of air to the furnace chamber which consists in projecting into the line of flow a jet of gas at a velocity exceeding that of sound.

"4. In a heating-furnace structure the combination with a furnace chamber of an air passageway leading thereto, means for projecting into said air passageway a flow-inducing jet of gas at a velocity exceeding that of sound, and means for admitting fuel to the induced stream, substantially as described.

"5. In a heating-furnace structure the combination with a furnace chamber provided with an intake passageway for air and an outgoing passageway for products of combustion, means for drawing the products of combustion through the outgoing passageway and means for projecting a flow-inducing jet of fluid at a velocity exceeding that of sound within the intake passageway, substantially as described.

"6. The method herein described of firing a furnace which consists in establishing conditions of low-velocity flow through the furnace as a whole and at the intake end increasing locally the flow to a flow of high velocity by projecting into the flow a jet of fluid at a velocity exceeding that of sound."

[*Official Gazette October 21, 1924.*]